UNITED STATES PATENT OFFICE.

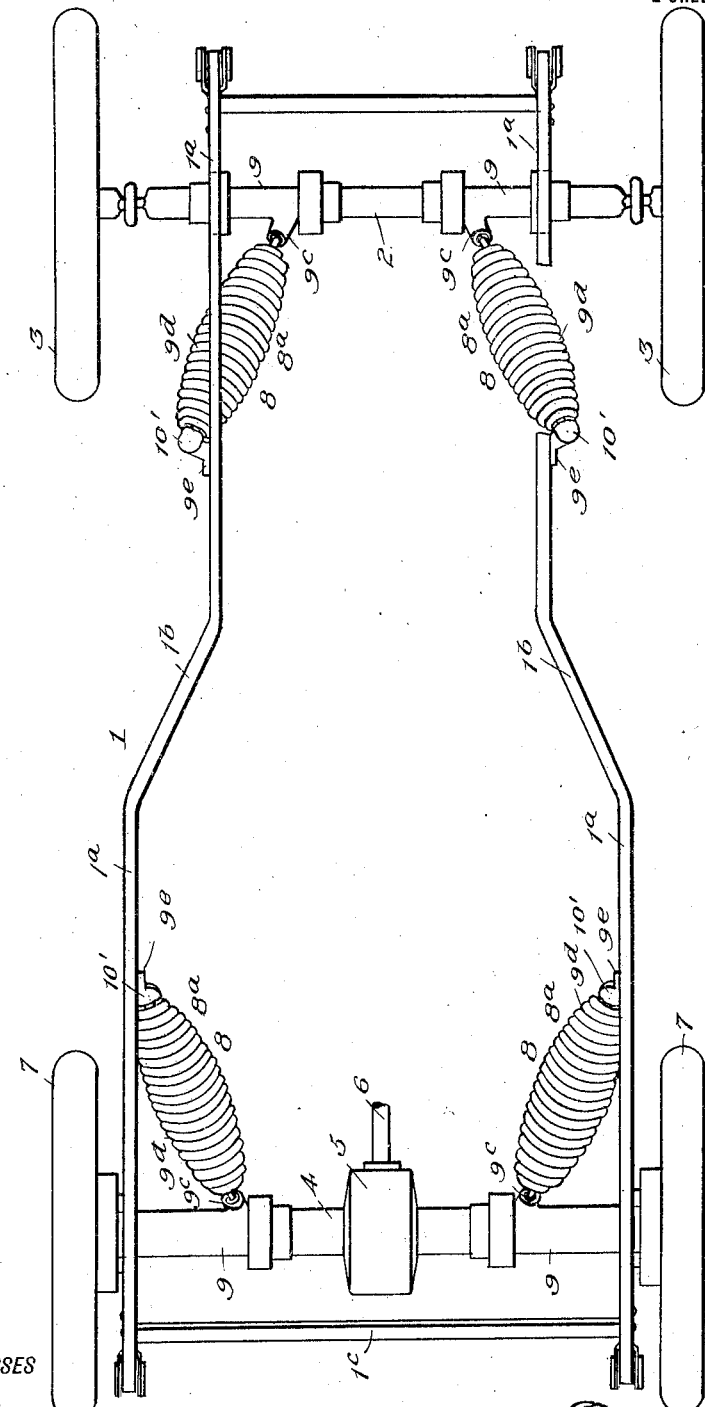

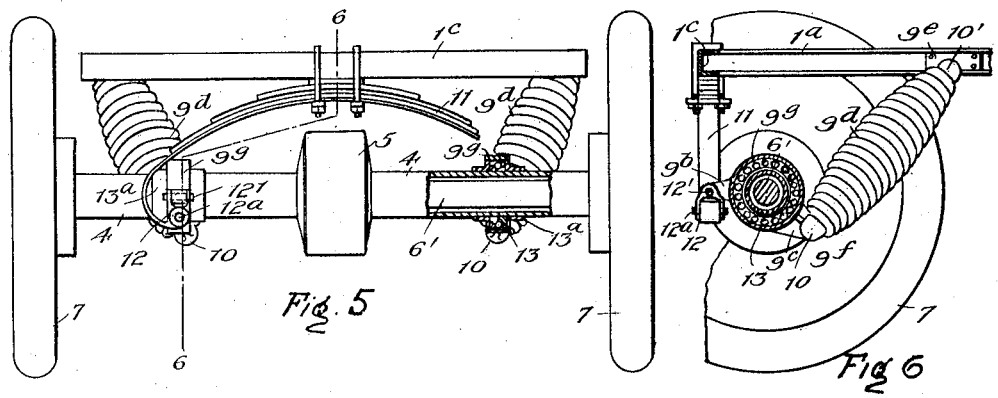
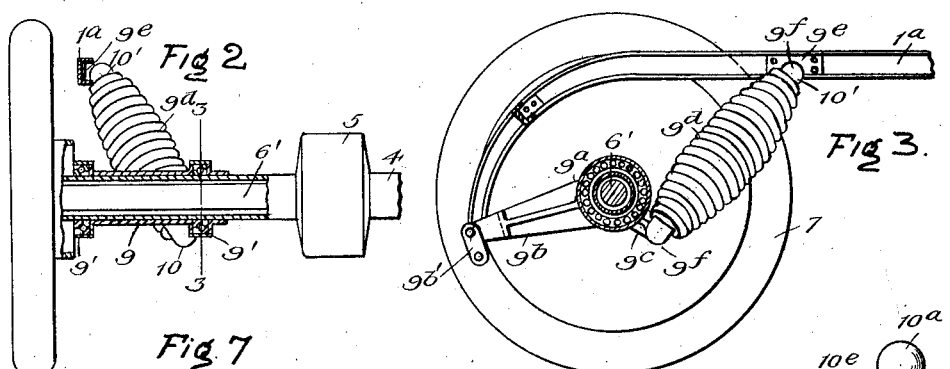
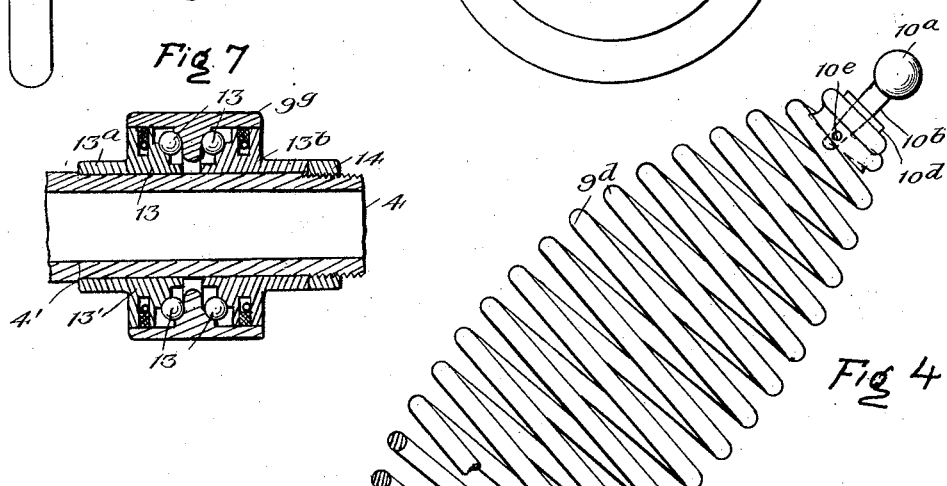
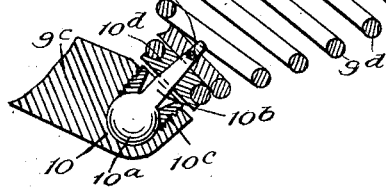

GEORGE JACOBS, OF DETROIT, MICHIGAN.

MOTOR-VEHICLE.

1,361,523.   Specification of Letters Patent.   Patented Dec. 7, 1920.

Application filed May 20, 1916, Serial No. 98,752. Renewed October 4, 1920. Serial No. 414,653.

*To all whom it may concern:*

Be it known that I, GEORGE JACOBS, a citizen of the United States, residing at Detroit, in the county of Wayne and State of Michigan, have invented certain new and useful Improvements in and Relating to Motor-Vehicles, of which the following is a specification.

This invention relates to improvements in running gear constructions for motor vehicles.

One of the objects of my invention is to provide a running gear construction which will have better riding characteristics than those now in use, including the absorbing of shocks and the eliminating of side swaying, to a large extent.

Another object is to reduce the wear and tear on the motor vehicle running gear construction, and the amount of power required for its operation, and to increase the life thereof.

Another object is to use springs of less weight and cost and which will be more durable than those now ordinarily used.

Another object is to produce a running gear having uniform action throughout a range of speed in operation from relatively high to relatively low speed, under various loads and taking into consideration the irregularities of road surfaces encountered.

Another object of my invention is to provide an efficient running gear construction which will take a wider body than the running gears now ordinarily used.

Other objects of my invention will be obvious from descriptions of embodiments of it which I have herein selected for the purposes of illustration.

Figure 1 is a top plan view of a running gear for a motor vehicle embodying my invention, parts being broken away.

Fig. 2 is a fragmentary rear view, partly in section, of parts shown in Fig. 1.

Fig. 3 is a fragmentary sectional view on the line 3—3 of Fig. 2, looking in the direction of the arrow.

Fig. 4 is an enlarged detail view of a suspension spring.

Fig. 5 is a rear view of a running gear embodying a slightly modified form of my invention, parts being broken away and others shown in section.

Fig. 6 is a fragmentary sectional view on the line 6—6 of Fig. 5.

Fig. 7 is a sectional, detail view of a double thrust bearing for one of the spring seats.

1 indicates as an entirety a running gear for a motor vehicle. It preferably comprises two longitudinal members $1^a$. Each of these members $1^a$ is preferably bent inwardly, as shown at $1^b$, intermediate its opposite ends. 2 indicates a front axle of any suitable construction for the motor vehicle, mounted on wheels 3, which may be steered in any manner desired. 4 indicates a rear axle as an entirety, of any suitable construction, the casing of which may be enlarged, as shown at 5, to inclose the differential mechanism. 6 indicates the propeller shaft, and $6'$, $6'$ the driven shaft sections, suitably geared together within the axle casing in any well known manner, (not shown). The front end of the propeller shaft 6 may be connected to and be driven in any suitable manner by a motor which is not shown in the drawings. 7 indicates the rear driving wheels of the vehicle which may be connected in any well known manner to the axle sections $6'$, $6'$, of the rear axle mechanism.

The parts just described may be of any desired or preferred form of construction. As they, in themselves, form no part of my present invention, further description thereof will not be necessary.

8 indicates as an entirety suspension means between the chassis 1 and the front and rear axles 2, 4. These means preferably comprise four sets of devices $8^a$, one of said sets being arranged between one side of each axle and the adjacent chassis member $1^a$.

As all the sets of devices are similar in construction, it will only be necessary to describe one of them as follows: 9 indicates a sleeve rotatably mounted upon the axle casing—for instance the rear axle 4, as shown in section in Fig. 2. Interposed between the sleeve 9 and the axle casing are sets of anti-friction bearings $9'$ which permit the free operation of the sleeve thereon. These bearings are preferably arranged at opposite ends of the sleeve, and at least one of them, the innermost one, preferably is of a construction to take end thrusts; so that the sleeve 9 is held against longitudinal movement on the axle casing. $9^a$ indicates a lever having an arm $9^b$ projecting rearwardly from the sleeve 9 and rigidly connected to said sleeve. At its outer end the arm $9^a$ is pivotally connected to one end of a shackle link $9^{b'}$, while the opposite end of said link is pivotally connected to the adjacent free end of the adjacent chassis member 1ª. 9ᶜ indicates a lever arm projecting downwardly and forwardly from the sleeve 9. The arm 9ᶜ is preferably formed integral with the sleeve 9. 9ᵈ indicates a compression spring interposed between the free end of the lever arm 9ᶜ and the bracket 9ᵉ on the adjacent chassis member 1ª. The longitudinal axis of this spring is preferably inclined upwardly and outwardly, and the lever arm 9ᶜ is preferably disposed about the axis of the sleeve 9 annularly relative to the lever arm 9ª, so that normally it extends radially in a direction that is substantially at right angles to the longitudinal axis of the spring 9ᵈ, as will be clearly understood from Fig. 3.

The opposite ends of the spring 9ᵈ are preferably connected to the free end of the lever arm 9ᶜ and chassis bracket 9ᵉ by universal joints or connecting devices 9ᶠ. Each of these connecting devices preferably comprises a socket 10 which receives a ball member 10ª, having a stem 10ᵇ. The open end of the socket 10 may be provided with screw threads with which is engaged an annular adjusting and retaining nut 10ᶜ. The inner face of this nut is shaped to engage with the surface of the ball member; the funnel shaped opening therethrough is of a size to permit movements of the ball without engaging the stem 10ᵇ thereof. 10ᵈ indicates a collar which is arranged to engage the adjacent end convolution of the spring 9ᵈ. This collar is held in place on the stem by a pin or key 10ᵉ and thus connects the spring 9ᵈ to the stem 10ᵇ of the ball 10ª. The socket 10 for that end of the spring which is connected to the lever 9ᶜ is preferably formed in the free end thereof, while the socket 10 for the ball 10ª at the opposite end of the spring 9ᵈ is formed in a socket member 10′, that is carried in any suitable manner by the bracket 9ᵉ.

In Figs. 5, 6 and 7 I have shown modifications.

The cross member 1ᶜ connecting the rear ends of the frame members 1ª, 1ª has secured to it a platform spring 11 which extends transversely of the frame and at either end is pivotally connected to the adjoining lever arm 9ᵇ carried by the lever 9ª, as by means of a shackle 12 transversely pivoted at 12′ to the lever arm 9ᵇ and connected by a longitudinally disposed pivot 12ª to the adjacent free end of the platform spring 11. In this modification the lever 9ª has a cylindrical section 9ᵍ which surrounds the tubular extension of the axle and is mounted on anti-friction bearings 13 which preferably takes the load and thrust in both directions. The inner member 13′ of this anti-friction bearing preferably has a boss 13ª which fits against the shoulder 4′ on the rear axle casing. The inner section 13ᵇ of this anti-friction bearing is adjusted toward and from the shoulder 4′ by means of a screw-threaded collar 14 on the axle casing. It will be understood that by adjusting the collar 14 the elements constituting the anti-friction bearing 13 may be properly related or adjusted.

The lever mounting illustrated in Fig. 7 may be substituted for that illustrated in Figs. 1, 2 and 3, if desired.

It will be noted that the end of each spring connected with the axle is relatively remote from the wheel, as compared with ordinary spring mounts, so that as the wheel rides over an irregularity, the necessary movement of the end of the spring connected to the axle in order to accommodate for such wheel movement, is reduced.

As the flexibility of the coiled springs employed by me is greater than that of flat springs, I take advantage of this fact and so combine the coiled springs and the flat springs into a three point suspension at the rear of the vehicle as to absorb road shocks with the utmost facility. Furthermore, in view of the angular disposition of the coiled spring between the axles and the frame or body of the vehicle, side swaying is relieved to a marked extent. The drive is preferably from the rear axle through the rear coiled springs to the frame, thence through the front coiled springs to the front axle. The disposition of the springs at substantially forty-five degrees angle provides for a wide margin of flexing of the springs when a sudden shock must be compensated for.

A part of the impulse or driving thrust from the rear axle through the rear coiled springs to the frame tends to push the frame or body upwardly. Each of the coiled springs through which the driving force is transmitted to the frame is located in front of the main driving element or rear axle, and has an upward inclination between said axle and frame, but is also connected around said axle to the rear end of the frame at the rear of the driving element or axle, the balance and arrangement of the parts being such as to insure great flexibility of spring action and elimination of side swaying; that is, each driving spring is connected to the frame or body of the vehicle in front of the driving axle and transmits driving thrusts from the driving axle to the frame, and is also connected to the rear end of the frame or body through an oscillatable support on the rear axle and connection therefrom to the frame or body.

It will be noted that each of the springs is preferably of double tapering helical form; that is, from the enlarged center portion of the spring the helix tapers in opposite directions. Not only are each pair of front and rear springs so arranged that they incline to the horizontal, but the springs of each pair diverge from each other.

To those skilled in the art of making mechanism of the class described, many alterations in construction and widely differing embodiments and applications of my invention will suggest themselves, without departing from the spirit and scope thereof. My disclosures and the description herein are purely illustrative, and are not intended to be in any sense limiting.

What I claim is:

1. In combination, a driving axle for a motor vehicle, a body support, coiled springs interposed between said driving axle and body support and extending upwardly from said rear axle casing and forwardly and connected at their upper ends to said body support and at their rear ends having oscillatable connections with said rear axle, and connections between said oscillatable connections and said body support.

2. In a motor vehicle the combination of front and rear axles and a body support extending therebetween, a pair of coiled springs at the opposite sides of the rear ends of said body support and extending upwardly and forwardly from said driving axle and connected at their upper ends to said body support and at their rear ends having oscillatable connections with said rear axle, and connections between said oscillatable connections and said body support, and a pair of coiled springs extending downwardly and forwardly from the front end of said body support, and connected to said front axle.

3. In a motor vehicle the combination of front and rear axles and a body support extending therebetween, a pair of coiled springs at the opposite sides of the rear ends of said body support and extending upwardly, forwardly and outwardly from said driving axle and connected at their upper ends to said body support and at their rear ends having oscillatable connections with said rear axle, and connections between said oscillatable connections and said body support, and a pair of coiled springs extending downwardly and forwardly from the front end of said body support, and connected to said front axle.

4. In a motor vehicle the combination of front and rear axles and a body support extending therebetween, a pair of coiled springs at the opposite sides of the rear ends of said body support and extending upwardly and forwardly from said driving axle and connected at their upper ends to said body support and at their rear ends having oscillatable connections with said rear axle, and connections between said oscillatable connections and said body support, and a pair of coiled springs extending downwardly, forwardly and inwardly from the front end of said body support, and connected to said front axle.

5. In a motor vehicle the combination of front and rear axles and a body support extending therebetween, a pair of coiled springs at the opposite sides of the rear ends of said body support and extending upwardly, forwardly and outwardly from said driving axle and connected at their upper ends to said body support and at their rear ends having oscillatable connections with said rear axle, and connections between said oscillatable connections and said body support, and a pair of coiled springs extending downwardly, forwardly and inwardly from the front end of said body support, and connected to said front axle.

6. In a motor vehicle the combination of front and rear axles and a body support extending therebetween, a pair of coiled springs at the opposite sides of the rear ends of said body support and extending upwardly and forwardly from said driving axle and connected at their upper ends to said body support and at their rear ends having oscillatable connections with said rear axle, a platform spring extending downwardly from the rear end of said body support and having its opposite ends connected to the adjacent oscillatable connections between the rear springs and the driving axle, and a pair of springs between the front end of said body support and said front axle.

7. In a motor vehicle the combination of front and rear axles and a body support extending therebetween, a lever oscillatably mounted on said rear axle and having arms extending forwardly and rearwardly, the rear arm being connected to said body support and a coiled spring interposed between the forwardly extending arm of said lever and a point on said body support in front of said driving axle, and a pair of springs between the front end of said body support and said front axle.

8. In a motor vehicle the combination of front and rear axles and a body support extending therebetween, a lever oscillatably mounted on said rear axle and connected at its rear end to said body support and a double tapered helical coiled spring interposed between the front end of said lever and a point on said body support in front of said driving axle, and a pair of springs between the front end of said body support and said front axle.

9. In combination, a driving axle for a motor vehicle, a body support, double tapered helical springs interposed between said driving axle and body support and extending upwardly from said rear axle casing and forwardly and connected at their upper ends to said body support and at their rear ends having oscillatable connections with said rear axle, and connections between said oscillatable connections and said body support.

10. In a motor vehicle the combination of front and rear axles and a body support extending therebetween, a pair of double tapered helical springs at the opposite sides of the rear ends of said body support and extending upwardly and forwardly from said driving axle and connected at their upper ends to said body support and at their rear ends having oscillatable connections with said rear axle, and connections between said oscillatable connections and said body support, and a pair of springs extending downwardly from the front end of said body support and connected to said front axle.

11. In a motor vehicle the combination of front and rear axles and a body support extending therebetween, a pair of double tapered helical springs at the opposite sides of the rear ends of said body support and extending upwardly, forwardly and outwardly from said driving axle and connected at their upper ends to said body support and at their rear ends having oscillatable connections with said rear axle, and connections between said oscillatable connections and said body support, and a pair of springs extending downwardly and forwardly from the front end of said body support, and connected to said front axle.

12. In a motor vehicle the combination of front and rear axles and a body support extending therebetween, a pair of springs at the opposite sides of the rear ends of said body support and extending upwardly and forwardly from said driving axle and connected at their upper ends to said body support and at their rear ends having oscillatable connections with said rear axle, and connections between said oscillatable connections and said body support, and a pair of double tapered helical springs extending downwardly, forwardly and inwardly from the front end of said body support, and connected to said front axle.

13. In a motor vehicle the combination of front and rear axles and a body support extending therebetween, a pair of double tapered helical springs at the opposite sides of the rear ends of said body support and extending upwardly, forwardly and outwardly from said driving axle and connected at their upper ends to said body support and at their rear ends having oscillatable connections with said rear axle, and connections between said oscillatable connections and said body support, and a pair of double tapered helical springs extending downwardly, forwardly and inwardly from the front end of said body support, and connected to said front axle.

14. In a motor vehicle the combination of front and rear axles and a body support extending therebetween, a pair of double tapered helical springs at the opposite sides of the rear ends of said body support and extending upwardly and forwardly from said driving axle and connected at their upper ends to said body support and at their rear ends having oscillatable connections with said rear axle, a platform spring extending downwardly from the rear end of said body support and having its opposite ends connected to the adjacent oscillatable connections between the rear springs and the driving axle, and a pair of coiled springs extending downwardly from the front end of said body support, and connected to said front axle.

In testimony whereof I affix my signature in the presence of two witnesses.

GEORGE JACOBS.

Witnesses:
  E. BOWEN,
  D. E. COULTER.